(12) United States Patent
Richter et al.

(10) Patent No.: US 9,307,346 B2
(45) Date of Patent: Apr. 5, 2016

(54) SYSTEM AND A METHOD FOR REMOTELY INTERACTING WITH ITEMS IN AN ELECTRICAL FIELD AFFECTED ENVIRONMENT

(71) Applicant: R2Z Innovations, Inc., Vancouver (CA)

(72) Inventors: Wolfgang Richter, Dortmund (DE); Faranak Zadeh, Vancouver (CA)

(*) Notice: Subject to any disclaimer, the term of this patent is extended or adjusted under 35 U.S.C. 154(b) by 319 days.

(21) Appl. No.: 14/140,495

(22) Filed: Dec. 25, 2013

(65) Prior Publication Data

US 2015/0180934 A1    Jun. 25, 2015

(51) Int. Cl.
| | |
|---|---|
| H04W 4/06 | (2009.01) |
| H04W 4/00 | (2009.01) |
| H04L 29/06 | (2006.01) |
| H04L 29/08 | (2006.01) |

(52) U.S. Cl.
CPC ............ *H04W 4/006* (2013.01); *H04L 29/06* (2013.01); *H04L 29/08* (2013.01); *H04W 4/005* (2013.01)

(58) Field of Classification Search
CPC ........ H04W 4/006; H04W 4/005; H04L 29/08; H04L 29/06
See application file for complete search history.

(56) References Cited

U.S. PATENT DOCUMENTS

| | | | |
|---|---|---|---|
| 2012/0112828 A1* | 5/2012 | Richter | H02J 17/00 327/564 |
| 2013/0076520 A1* | 3/2013 | Kovacich | G01R 19/155 340/660 |

* cited by examiner

*Primary Examiner* — Ebrahim Golabbakhsh

(57) ABSTRACT

A method and a system for remotely interacting with items in an electric field affected environment for communicating with a computing device is provided. The system includes a host for receiving commands from a computing device and a client for receiving and performing the signals received from the host. The host sends signals via modulated electric field. The client interacts with the items in the environment to determine their presence and location. The client further includes sensing devices and acting devices for sensing the condition of the items and manipulating the items respectively.

20 Claims, 5 Drawing Sheets

FIG. 5

| XOP code from host | Name | Function |
|---|---|---|
| snc | sync | synchronizes all items with the host, all items send their data in their time slots and go to sleep mode until the next sync |
| rpt | repeat | A selected item repeats sending data until a sync is sent |
| inp | serial input | Item reads serial data form sensors and sends them to host |
| out | serial output | Item reads serial data from host and sends them to actors |
| tsl | timeslot | Time Slot for an item (e.g. 20 ms after sync) Item only sends and receives data in its time slot |
| son | switch on | Item switches attached appliance or actor on |
| off | switch off | Item switches attached appliance or actor off |

US 9,307,346 B2

SYSTEM AND A METHOD FOR REMOTELY INTERACTING WITH ITEMS IN AN ELECTRICAL FIELD AFFECTED ENVIRONMENT

FIELD OF THE INVENTION

The present invention generally relates to a method and a system for object identification, and more particularly relates to a method and a system for remotely interacting with items in an electrical field affected environment.

DESCRIPTION OF RELATED ART

Internet now is being used with other technologies to meet the requirements of humans. One such field is known as Internet of Things (IOT). The Internet of things, also known as the Internet of objects, refers to the networked interconnection of everyday objects. It is described as a self-configuring wireless network of sensors whose purpose would be to interconnect all things. The concept is attributed to the former Auto-ID Center, founded in 1999, based at the time at the Massachusetts Institute of Technology (MIT).

Various systems operate on IOT to identify the items. Such systems are equipped with additional processing units which need power supply, interfaces, sensors, actors and one or more wireless transceivers such as Wi-Fi, Bluetooth etc. These systems use Radio-Frequency waves for communication with the computing devices.

Radio-frequency identification (RFID) is a technology that uses communication via radio waves to exchange data between a reader and an electronic tag attached to an object, for the purpose of identification and tracking. Some tags can be read from several meters away and beyond the line of sight of the reader. The application of bulk reading enables an almost parallel reading of tags.

However, it is proven that electromagnetic microwaves are harmful for human tissue and is likely that the use of such radio frequencies can be restricted for the sake of health of humans. Battery operated small devices often use button cells for providing the electrical energy. It is known that such batteries are dangerous for the environment and unsafe in uses. Therefore, there is a need of a method and a system operating on electrical field for remotely interacting to provide condition and position of the items. Further, the method and the system should provide power without the use of batteries.

SUMMARY OF THE INVENTION

In accordance with the teachings of the present invention, a system and a method for remotely interacting with items in an electric field affected environment for communicating with a computing device is provided.

An object of the present invention is to provide a system for remotely interacting with items in an environment for communicating with a computing device including a host connected with the alternating current source of the refrigerator and a client for interacting with the items affected by the electric field in the environment.

The host includes a convertor for generating DC power from the received AC power from the alternating current source, a generator for generating electric field from contactlessly received DC power from said convertor, a demodulator for receiving data from the computing device, a host controller modulates the electric field and further said host controller process data received from the modulator and further the host controller generates a signal and further generates an identification number for each item, and a wireless interface for sending the processed data to the computing device.

The client includes an electric field harvester for enhancing electric field provided by host within the environment and further stores DC power from the electric field, a client controller for processing the signal received via the modulated electric field from the host controller and further reads the identification number for each items received from the host controller and further generates a feedback for the host controller, and an interface for handling the switching operations from the client controller.

Another object of the present invention is to provide buffers for storing the DC power in both the client and the host.

Another object of the present invention is to provide a sensing device for receiving the processed signal from the client controller for sensing the condition of the items and further generating a feedback for the client controller.

Another object of the present invention is to provide a sensing device for receiving the processed signal from the client controller for sensing the alterations produced by the items within the electric field and further generating a feedback for said client controller.

Another object of the present invention is to provide a system with one or more acting devices for receiving the processed signal from said client controller for manipulating the conditions of the items.

Another object of the present invention is to provide a system wherein the host further comprising a switch or gate controlled by the host controller for switching demodulator to read data received from the client controller.

Another object of the present invention is to provide a system wherein the sensing device further detects the action of a user altering the electric field produced by the generator within the environment.

Another object of the present invention is to provide a system wherein the client further includes a light source for emitting light signals on receiving signals from the client controller.

Another object of the present invention is to provide a system for remotely interacting with food products inside an electric field affected refrigerator for communicating with a computing device. The system includes a host integrated in the refrigerator generates a signal and the client interacts with the food products inside the refrigerator on receiving signals from the host. A host works like an internet hub.

Another object of the present invention is to provide a system for remotely interacting with books/files inside office/library in an electric field affected for communicating with a computing device.

Another object of the present invention is to provide a method for remotely interacting with items in an electric field affected environment and communicating with the computing device.

Further features and advantages of the present invention, as well as the structure and operation of various embodiments of the present invention, are described in detail below with reference to the accompanying drawings.

BRIEF DESCRIPTION OF DRAWINGS

FIG. 5 illustrates a table for defining exemplary signals generated from the host for the client in accordance with an exemplary embodiment of the present invention.

DETAILED DESCRIPTION OF DRAWINGS

Figure 1:
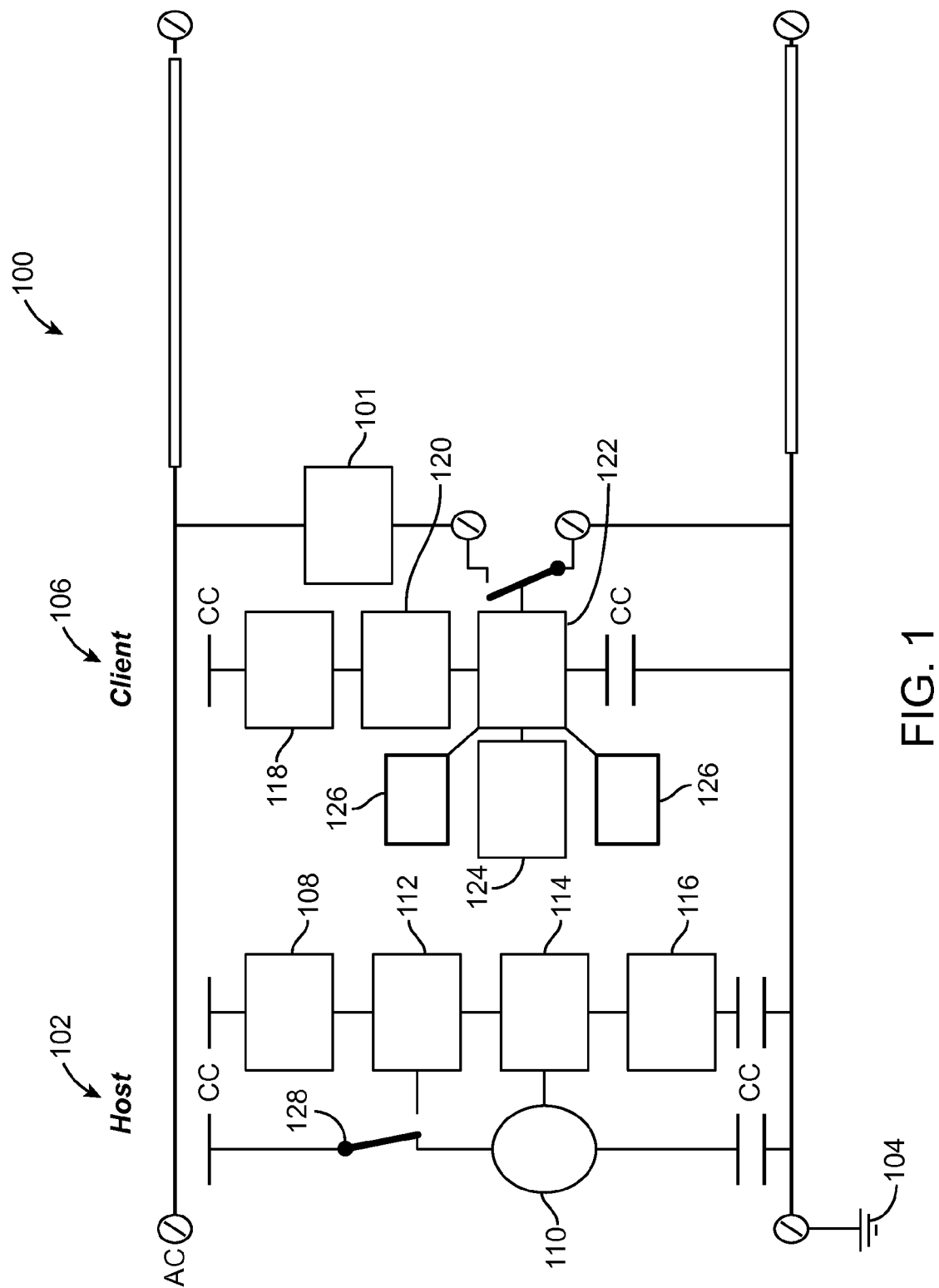
FIG. 1 illustrates a block diagram of a system for remotely interacting with items in an environment for communicating with a computing device, in accordance with a preferred embodiment of the present invention.

While this technology is illustrated and described in a preferred embodiment, a method and a system for remotely interacting with items in an electric field affected environment for communicating with a computing device may be produced in many different configurations, forms and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a block diagram of a system 100 for remotely interacting with items in an electric field affected environment 101. The system 100 includes a host 102 connected to an alternating current source 104 in the environment 101 and a client 106 for interacting with the items affected by the electric field in the environment 101. The host 102 includes a converter 108, a generator 110, a demodulator 112, a host controller 114 and a wireless interface 116. The client 106 includes an electric field harvester 118, a client controller 120 and an interface 122.

In a preferred embodiment of the present invention, the converter 108 generates DC power from the received AC power from the alternating current source. Examples of converter 108 includes but not limited to rectifiers, inductor, resonator, cascade, diode bridges, transformer, level shifter etc. However, it will be readily apparent to those with ordinary skill in the art that the various other types of converter 108 may also be used for generating DC power from the AC power without deviating from the scope of the present invention.

The generator 110 creates an alternating electric field from contactlessly converted DC power from the converter 108. Examples of generator 110 includes but not limited to oscillators, PWM, VCO, DAC, gates, multivibrators etc. However, it will be readily apparent to those with ordinary skill in the art that the various other types of generator 110 may also be used for generating electric field without deviating from the scope of the present invention.

The demodulator 112 receives data from the computing device and further transmits the data to the host controller 114. The demodulator 112 may include a radio frequency tuner that receives a transmission via the Internet, from a cable TV coaxial cable, satellite radio, or a broadcast radio frequency aerial transmission. The radio frequency tuner can receive the data signal via electromagnetic radio wave transmission over the carryover wire or through the air.

For Internet reception, demodulator/tuner 210 may further include an IP network interface that receives a transmission from an Internet twisted pair, a wireless interface or other IP medium that receives a transmission from an Internet source and/or, an optical receiver that receives a transmission from an Internet fiber or through the air. However, it will be readily apparent to those skilled in the art that the various other types of converter 108 may also be used for receiving and transmitting data.

The host controller 114 modulates the electric field and further process data received from the demodulator 112. In a preferred embodiment of the present invention, the processed data is contactlessly received by the host controller 114 from the demodulator 112. Further, the host controller 114 generates a signal for the client controller 122. Examples of signal are explained in detail in conjunction with FIG. 5 of the present invention.

Further, the host controller 114 generates an identification number for marking each item in the environment. The identification number identifies the item in the environment. Examples of the identification number include but not limited to numeric or alphanumeric keys, color or condition keys etc.

The wireless interface 116 sends the processed data received from the host controller 114 to the computing device. Examples of wireless interface 116 include but not limited to bluetooth, internet, intranet etc.

The electric field harvester 118 enhances electric field energy provided by the host 102 within the environment 101. The electric field harvester works on the principle of an AC circuit using preferably capacitive coupled electrodes and DC rectifying means to enhance the electric field provided from the host 102.

The client controller 120 process the signal received via modulated electric field from the host controller 114. The principle of receiving signals from electric field is known in the art. Examples of the client controller 120 include but not limited to MCU, SOCs, FPGAs, state machines or other logic circuits. The signals contain commands to be performed by the client controller 120. Example of the commands is explained in detail in conjunction with FIG. 5 of the present invention.

Further, the client controller 120 reads the identification number of each item in the environment 101 received from the host controller 114 via the modulated electric field. The identification number helps the client controller 122 to identify the item for which the signal is send by the host controller 114. The client controller 122 further generates a feedback data for the host controller 114. The feedback data contains the data generated after performing commands provided in the signals from the host controller 114. The feedback data may relates to the presence or/and location of the items in the environment. The host controller 114 then transmits the data to the wireless interface 116 for sending it further to the computing device. Examples of computing device includes but not limited to IPAD, Phones, laptop, notebook, TV etc.

The interface 122 handles the switch operations from the client controller 120. The switch operations related to the items functions, to alter electric loads or charges, turning on or off item elements like motors, heaters, coolers, illumination, sound, video etc. Examples of interface include but not limited to I/O-ports, gates, flip-flops, opto-couplers, relais, triacs, IGBTs, MOSFETs etc.

In another embodiment of the present invention, the host 102 and the client 106 both includes buffers for storing the excess DC power. The electric field harvester 118 enhances the electric field energy and the energy portions are used to continuously fill buffers.

In another embodiment of the present invention, the client 106 further includes a sensing device 124 for receiving processed signal from the client controller 120 for performing the commands from the host controller 114. In a preferred embodiment of the present invention, the client controller 120 senses the condition of the items and then generates a feedback data related to the condition of the items for the client controller 120. Examples of the data generated from the condition of items are explained in detail in conjunction with FIG. 2 and FIG. 3 of the present invention.

In another embodiment of the present invention, the sensing device 124 senses the alterations produced by the items within the electric field affected environment. Then the feedback data related to the alterations produced by the items is send to the client controller 120.

In another embodiment of the present invention, the client 106 further includes one or more acting devices 126 for receiving the processed signal from the client controller 120 for manipulating the condition of the items. The manipulation of the condition of the items is explained in detail in conjunction with FIG. 2 and FIG. 3 of the present invention.

In another embodiment of the present invention, the host 102 further includes a switch 128 controlled by the host controller 114 for switching demodulator to read data received from the client controller 120.

In another embodiment of the present invention, the client 106 further includes a signal source unit 128 for emitting light or audio signals on receiving signals from the client controller 122. In a preferred emit the light signals and audio signals to identify the location of the items in the environment 101. Examples of signal source unit 128 includes but not limited to LED, Speakers, and combination etc.

Figure 2:
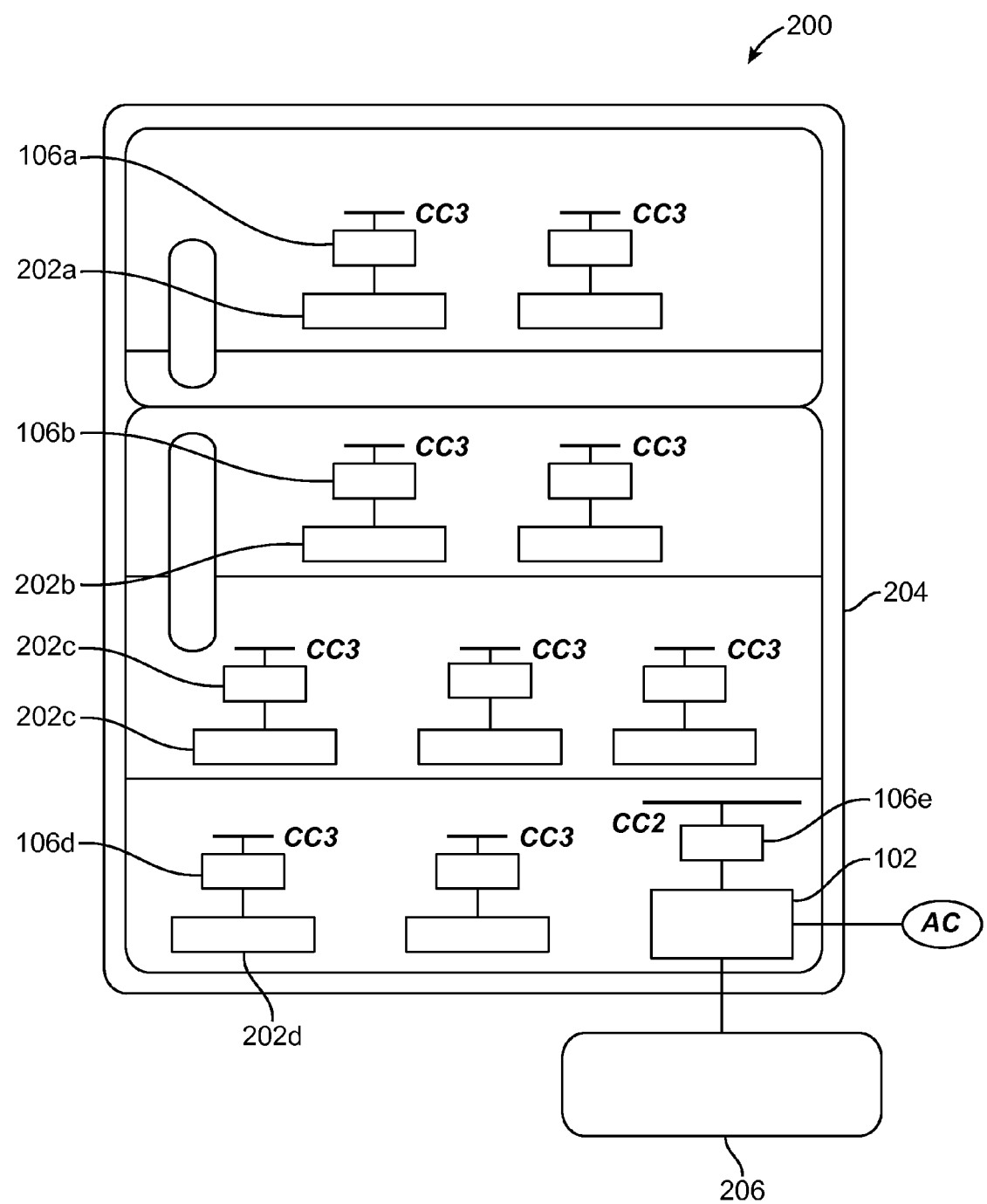
FIG. 2 illustrates a block diagram of a system for remotely interacting with food products inside a refrigerator for communicating with a computing device, in accordance with an exemplary embodiment of the present invention.

FIG. 2 illustrates a block diagram of a system 200 for remotely interacting with food products 202 such as 202a, 202b, 202c and 202d inside a refrigerator 204 for communicating with a computing device 206, in accordance with an exemplary embodiment of the present invention. With reference to FIG. 1, the one or more clients 106 such as 106a, 106b 106c and 106d interacts with the food products 202 on receiving signals from the host 102.

In another preferred embodiment of the present invention, with reference to FIG. 1, the sensing device (not shown in FIG. 2) on receiving a signal from the host controller 102 senses the condition of the items by measuring the difference in the electrical impedance by sensing the alterations in the electrical field. The electrical impedance is the measure of the opposition when a voltage is applied. The data collected by the sensing device (not shown in FIG. 2) is transmitted to the client controller (not shown in FIG. 2) and further is send to the host controller 102.

In a preferred embodiment of the present invention, the measure of electrical impedance provides the details about the quality of the food. For example, a milk product is present in the refrigerator. It is known that if the milk product returns certain impedances at certain frequencies.

Further the one or more acting devices (not shown in FIG. 2) receives the processed signal from the client controller (not shown in FIG. 2) for manipulating the condition of the items. The manipulation means to arrange molecular structures or defend bacteria or fungus. Examples of the acting devices (not shown in FIG. 2) include but not limited to field emitters, coils, vibrators heaters and coolers etc.

In another preferred embodiment of the present invention, the host controller (not shown in FIG. 2) releases a host identification number for the computing device. Further, at least one client 106e is attached to the host 102, the client controller (not shown in FIG. 2) reads the host identification number. Thus, enables the user to locate the host present in the refrigerator with the help of host identification number read by the client 106e attached to the host 102.

It will be readily apparent to those skilled in the art that more than one host 102 may be positioned inside the refrigerator. Also, it will be readily apparent to those skilled in the art that one or more host devices may be located in any environment like office, library, washing machines etc without deviating from the scope of the present invention.

Figure 3:
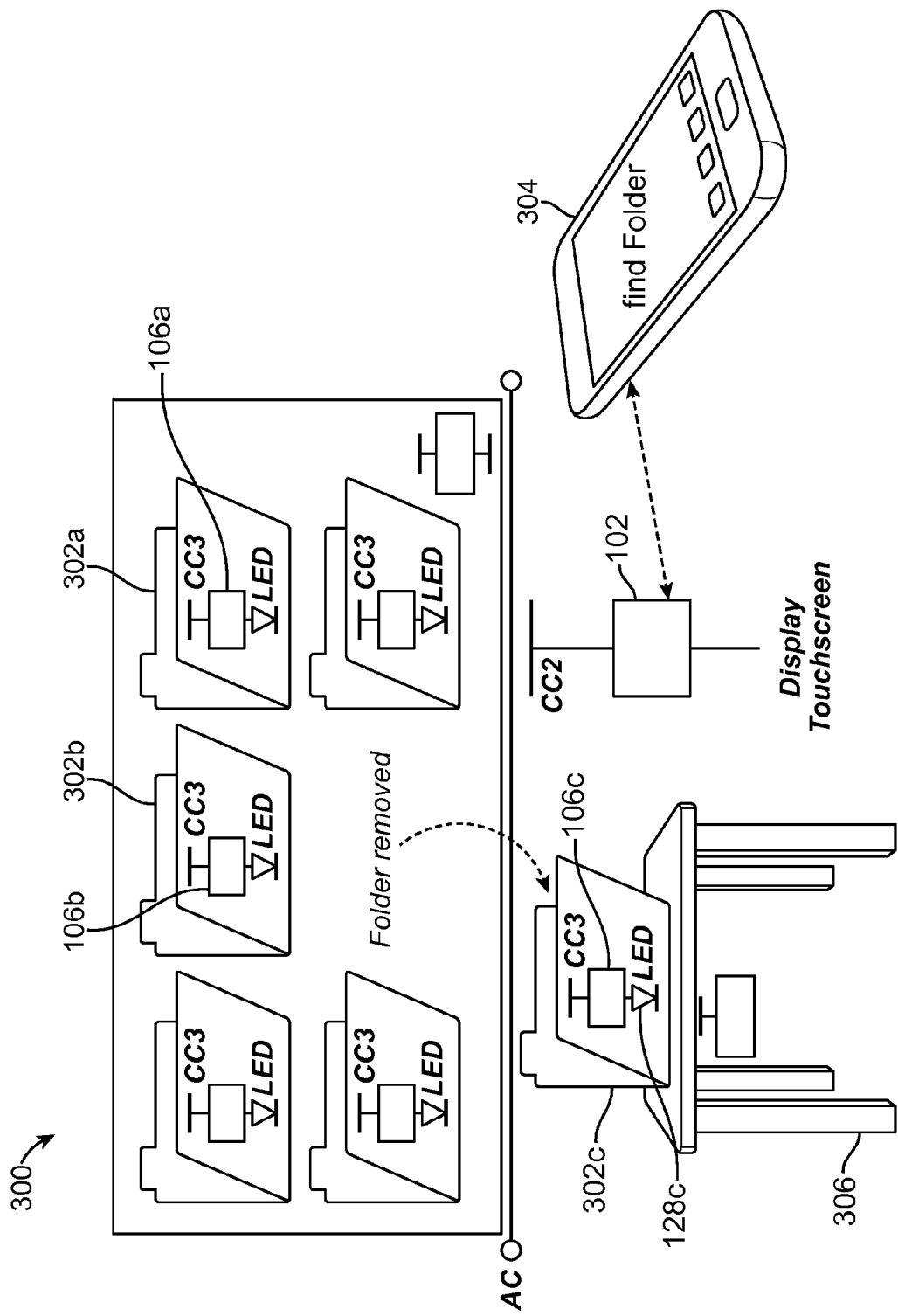
FIG. 3 illustrates a block diagram of a system for remotely interacting with documents in a room for communicating with a computing device, in accordance with another exemplary embodiment of the present invention.

FIG. 3 illustrates a block diagram of a system 300 for remotely interacting with the documents 302 such as 302a, 302b and 302c in a room for communicating with a computing device 304. In a preferred embodiment of the present invention, the one or more clients 106 such as 106a, 106b and 106c reads the identification number provided by the host controller 102 to interact with the documents 302. After interaction, the data collected by the one or more clients 106 is send back to the host 102. For example, the data collected after interaction may include about the number of documents present in the room.

In another preferred embodiment of the present invention, the sensing device senses the location of the documents by determining the alterations within the electric field. On identifying the location of the documents, the sensing device (not shown in FIG. 3) sends back the data related to the location of the documents to the host 102. The client controller (not shown in FIG. 3) segregates the documents on the basis of identification number send by the host 102.

For exemplary purposes, the documents 302 are books and the room is a library having various shelves. Suppose a book 302c is removed from the shelf and is placed on the table 306, thus in order to find it, a command is given from the computing device 304 to find the book 302c to the host 102. The host 102 then sends a signal to the client 106 to locate the book 302c and after locating the data related to the position of the book 302c is send back to the host 102 and then to the computing device 304.

In another exemplary embodiment, the host 102 gives command to the client 106 to produce light signals on locating the book 302c. The client 106c then gives command to the signal source unit 128c to produce light signals to help a user to identify the location of the book 302c.

Figure 4:
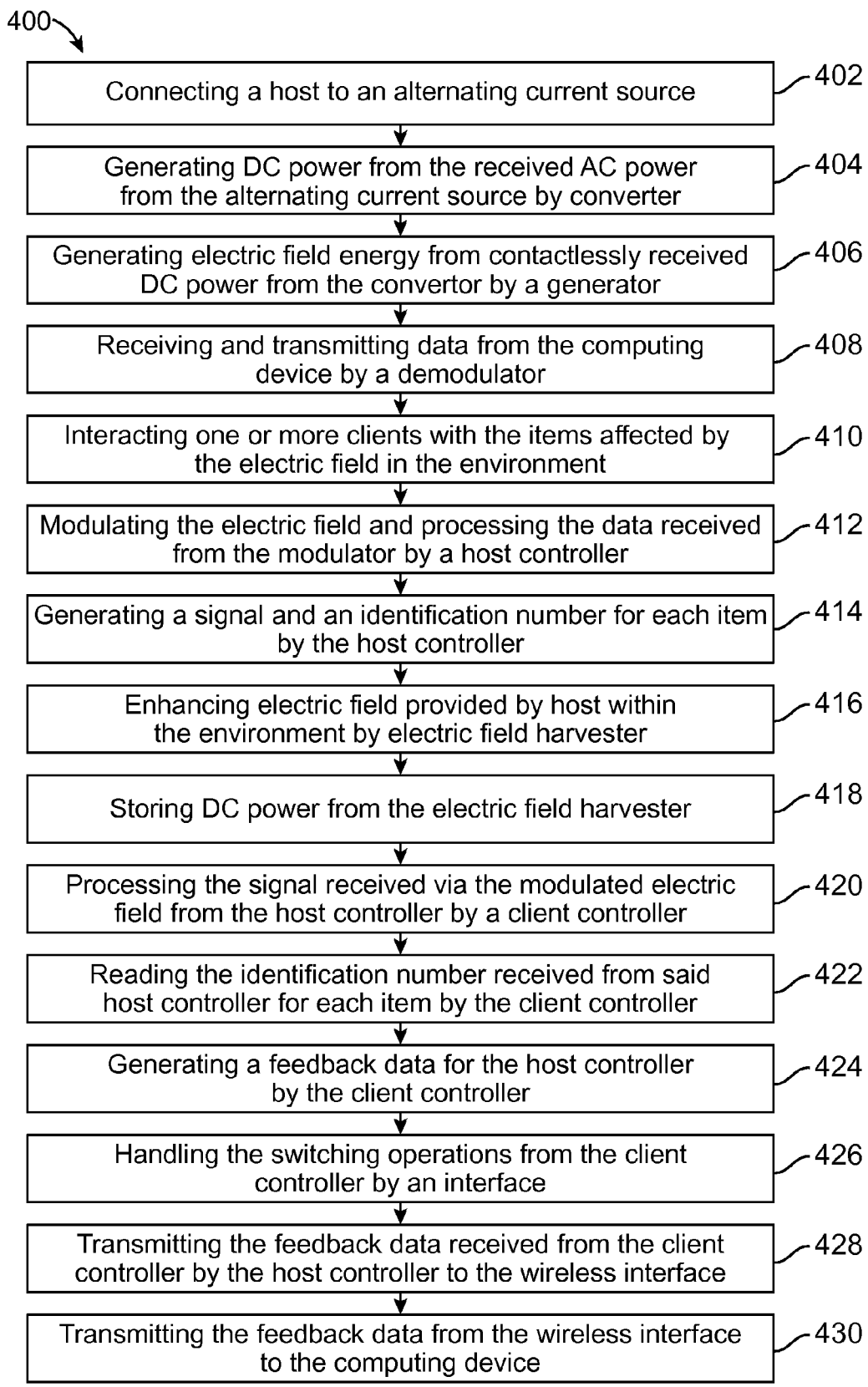
FIG. 4 illustrates a flowchart of a method for remotely interacting with food products inside a refrigerator for communicating with a computing device, in accordance with an exemplary embodiment of the present invention.

FIG. 4 illustrates a flowchart of a method 400 for remotely interacting with food products inside a refrigerator for communicating with a computing device. The method 400 initiates with a step 402 of connecting a host to an alternating current source. The connection of the host to the alternating current source is explained in detail in conjunction with FIG. 1 of the present invention.

The step 402 is then followed by a step 404 of generating DC power from the received AC power from the alternating current source by converter. The generation of DC power is explained in detail in conjunction with FIG. 1 of the present invention.

The step 404 is then followed by a step 406 of generating electric field from contactlessly received DC power from the convertor by a generator. The generation of electric field is explained in detail in conjunction with FIG. 1 of the present invention.

The step 406 is then followed by a step 408 of receiving and transmitting data from the computing device by a demodulator. The functionality of the receiving and transmitting data from the computing device is explained in detail in conjunction with FIG. 1, FIG. 2 and FIG. 3 of the present invention.

The step 408 is then followed by a step 410 of interacting one or more clients with the items affected by the electric field in the environment. The interaction of one or more clients with the items is explained and detail in conjunction with FIG. 1, FIG. 2 and FIG. 3 of the present invention.

The step 410 is then followed by a step 412 of modulating the electric field and processing the data received from the modulator by a host controller. The step 412 is then followed by a step 414 of generating a signal and identification number for each item by the host controller. The functionality of the host controller is explained in detailed in conjunction with FIG. 1 of the present invention.

The step 414 is then followed by a step 416 of enhancing electric field provided by host within the environment by electric field harvester. The step 416 is then followed by a step 418 of storing DC power from the electric field by the electric field harvester. The functionality of the electric field harvester is explained in detail in conjunction with FIG. 1 of the present invention.

The step 418 is then followed by a step 420 of processing the signal received via the modulated electric field from the host controller by a client controller. The process of receiving signal from the modulated electric field is explained in detail in conjunction with FIG. 1 of the present invention.

The step 420 is then followed by a step 422 of reading the identification number received from the host controller for each item by the client controller. The identification number allows the client controller to identify each item present in the room affected by the electric field. The process of reading the identification number by the client controller is explained in detail in conjunction with FIG. 1, FIG. 2 and FIG. 3 of the present invention.

The step 422 is then followed by a step 424 of generating a feedback data for the host controller by the client controller. The feedback data contains the details of the data received on interaction with the items. In a preferred embodiment of the present invention, the data may relate to the condition and the location of the items.

The step 424 is then followed by a step 426 of handling the switching operations from the client controller by an interface. The switching operation by interface is explained in detail in conjunction with FIG. 1 of the present invention.

The step 426 is then followed by a step 428 of transmitting the feedback data received from the client controller by the host controller to the wireless interface. Thereafter, the step 428 is followed by the step 430 of transmitting the feedback data from the wireless interface to the computing device. The step of transmitting data from the client controller to host controller and further from host controller is explained in detail in reference to FIG. 1, FIG. 2 and FIG. 3 of the present invention.

FIG. 5 illustrates a table 500 for defining exemplary signals generated from the host for the client. In an exemplary embodiment of the present invention, the host controller generates signals for the client. Examples of the host controller include but not limited to following:

a) snc (Sync) for synchronizes all items with the host, all items send their data in their time slots and go to sleep mode until the next sync
b) rpt (repeat) for sending data repeatedly from a selected item until a sync is sent
c) inp (serial input) client controller reads serial data and sends them to host controller
d) out (serial output) client controller reads serial data from host controller and sends them to acting devices
e) tsl (timeslot) for sending and receiving data in a time slot by a client (e.g. 20 ms after sync)
f) son (switch on) for switching attached appliance or actor on by the client
g) off (switch off) for switching attached appliance or actor off by the client It will be noted that those skilled in the art may envisioned various signal to communicate from host to client without deviating from the scope of the present invention.

The present invention offers various advantages. The present invention allows a user to identify any item present in an environment affected by the electric field. The present invention allows a user to identify from a remote location about the quality of food products inside the refrigerator, locate any document, book in an office or library, and number and color of clothes in the washing machine. The present invention communicates with a computing device and thus enables the user to communicate with the items in an environment from a remote location resulting in saving their time and brings a whole new world of internet of things.

There has thus been shown and described a method and a system for remotely interacting with items affected by electric field in the environment which fulfills all the objects and advantages sought there for. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A system for remotely interacting with items in an environment for communicating with a computing device, said system said system comprising:

a host connected to an alternating current source in the environment, said host comprising;
    a converter for generating DC power from the received AC power from the alternating current source;
    a generator for generating alternating electric field from contactlessly converted DC power from said converter;
    a demodulator for receiving and transmitting data from the computing device;
    a host controller modulates the electric field and further said host controller process data received from said demodulator and further said host controller generates a signal and further generates an identification number for marking each item; and
    a wireless interface for sending the processed data to the computing device; and
one or more clients for interacting with each item affected by the electric field in the environment, said client comprising:
    an electric field harvester for enhancing electric field provided by said host within the environment, further said electric field harvester stores DC power from the electric field;
    a client controller for processing the signal received via the modulated electric field from said host controller, said client controller further reads the identification number for each items received from said host controller and generates a feedback data for said host controller; and
    an interface for handling the switching operations from said client controller,
wherein said host controller transmit the feedback data received from said client controller to said wireless interface and further the feedback data is transmitted to the communicating device.

2. The system according to claim 1 wherein said client and said host comprising buffer for storing the DC power.

3. The system according to claim 1 further includes a sensing device receives the processed signal from said client controller for sensing the condition of the items and generates a feedback data for said client controller.

4. The system according to claim 1 further includes a sensing device for receiving the processed signal from said controller, further said sensing device for sensing the alterations produced by the items within the electric field and generating a feedback for said client controller.

5. The system according to claim 1 further includes one or more acting devices for receiving the processed signal from said client controller for manipulating the condition of the items.

6. The system according to claim 1 wherein said host further comprising a switch controlled by the host controller for switching demodulator to read data received from said client controller.

7. The system according to claim 1 wherein said sensing device further detects the action of a user altering the electric field produced by the generator within the environment.

8. The system according to claim 1 wherein said client further includes a signal source unit for emitting light or audio signals on receiving signals from said client controller.

9. A system for remotely interacting with food products inside a refrigerator for communicating with a computing device, said system said system comprising:
   a host connected with the alternating current source of the refrigerator, said host comprising;
      a converter for generating DC power from the received AC power from the alternating current source;
      a generator for generating alternating electric field from contactlessly converted DC power from said converter;
      a demodulator for receiving data from the computing device;
      a host controller modulates the electric field and further said host controller process data received from said demodulator and further said host controller generates a signal and an identification number for marking each food product; and
      a wireless interface for sending the processed data to the computing device; and
   one or more clients for interacting with each of the food product placed inside the refrigerator, said client comprising:
      an electric field harvester for enhancing electric field provided by host within the refrigerator, further said electric field harvester stores DC power from the electric field;
      a client controller for processing the signal received via the modulated electric field from said host controller, further said client controller reads the identification number for each food product received from said host controller and generates a feedback data for said host controller; and
      an interface for handling the switching operations from said client controller,
   wherein said host controller transmit the feedback data received from said client controller to said wireless interface and further the feedback data is transmitted to the communicating device.

10. The system according to claim 9 wherein said client and said host comprising buffer for storing the DC power.

11. The system according to claim 9 further includes a sensing device for receiving the processed signal from said client controller, further said sensing device for sensing the condition of the food products and generates a feedback for said host controller.

12. The system according to claim 1 further includes a sensing device for receiving the processed signal from said controller, further said sensing device for sensing the alterations produced by the food products within the electric field and generating a feedback for said host controller.

13. The system according to claim 1 further includes one or more acting devices for receiving the processed signal from said client controller for manipulating the condition of the food products.

14. The system according to claim 1 wherein said host further comprising a switch controlled by the host controller for switching demodulator to read data received from said client controller.

15. The system according to claim 1 wherein said sensing device further detects the action of a user altering the electric field produced by the generator within the refrigerator.

16. The system according to claim 1 wherein said client further includes a signal source unit for emitting light or audio signals on receiving signals from said client controller.

17. A method for remotely interacting with items in an environment for communicating with a computing device, the method comprising the steps of:
   connecting a host device to an alternating current source;
   interacting a client with the items affected by the electric field in the environment;
   generating DC power from the received AC power from the alternating current source by converter;
   generating alternating electric field from contactlessly converted DC power from the convertor by a generator;
   receiving and transmitting data from the computing device by a demodulator;
   modulating the electric field and processing the data received from the modulator by a host controller;
   generating a signal and an identification number for marking each item;
   enhancing electric field provided by host within the environment by electric field harvester;
   storing DC power from the electric field by the electric field harvester;
   processing the signal received via the modulated electric field from the host controller by a client controller;
   reading the identification number received from said host controller for each item;
   generating a feedback data for the host controller;
   handling the switching operations from the client controller by an interface;
   transmitting the feedback data received from the client controller by the host controller to the wireless interface;
   transmitting the feedback data from the wireless interface to the computing device.

18. The method according to claim 17 further comprising the steps of:
   receiving processed signal from the client controller by a sensing device for sensing the conditions of the items;
   receiving processed signal from the client controller by a sensing device for sensing the alterations produced by the items within the electric field;
   detecting the action of a user altering the electric field produced by the generator within the environment; and
   generating a feedback data for the client controller.

19. The method according to claim 17 further comprising the step of receiving the processed signal from said client controller for manipulating the condition of the items by one or more acting devices.

20. The method according to claim 17 further comprising the step of emitting light or audio signals on receiving signals from the client controller.

\* \* \* \* \*